Dec. 24, 1935.    E. L. KRAFT    2,025,597
WINDSHIELD FOR AUTOMOBILES
Filed Aug. 25, 1931    2 Sheets-Sheet 1
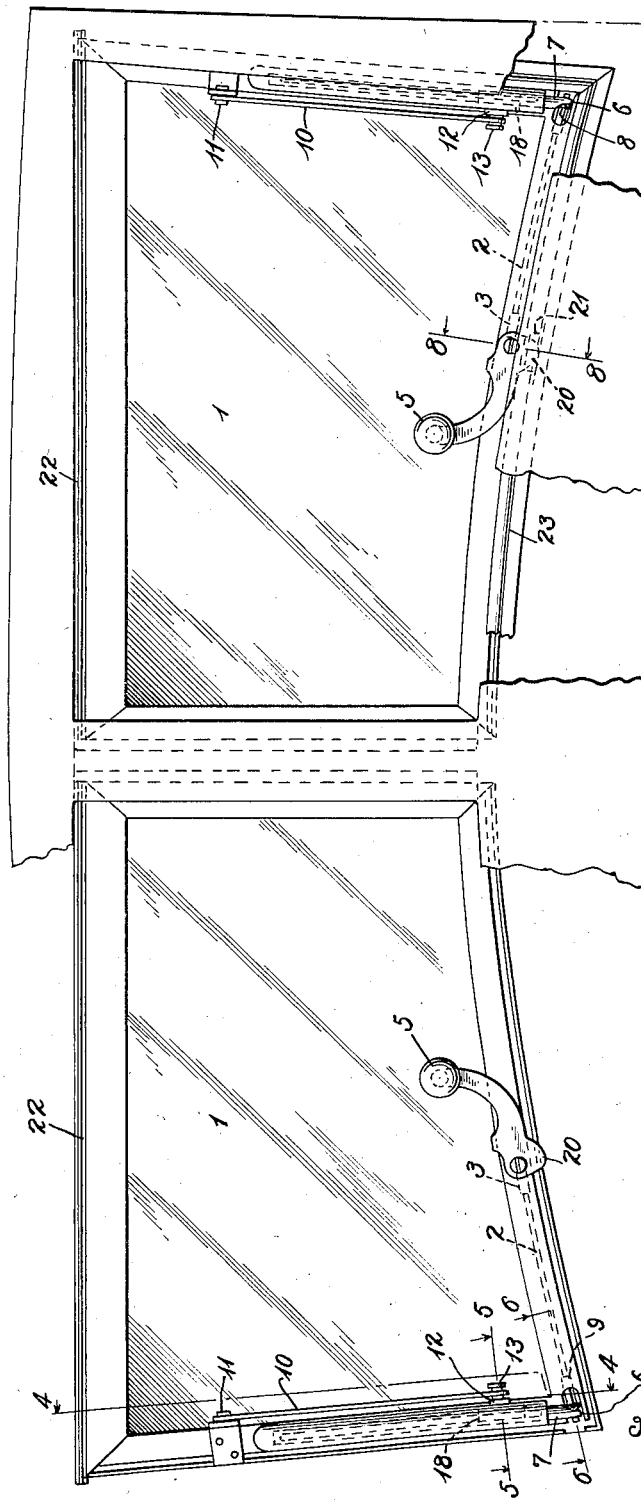
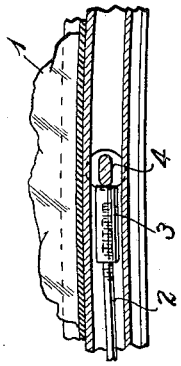
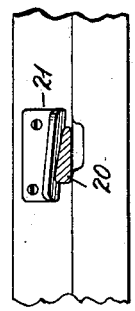
Inventor
Edward L. Kraft
By Bacon & Thomas
Attorneys

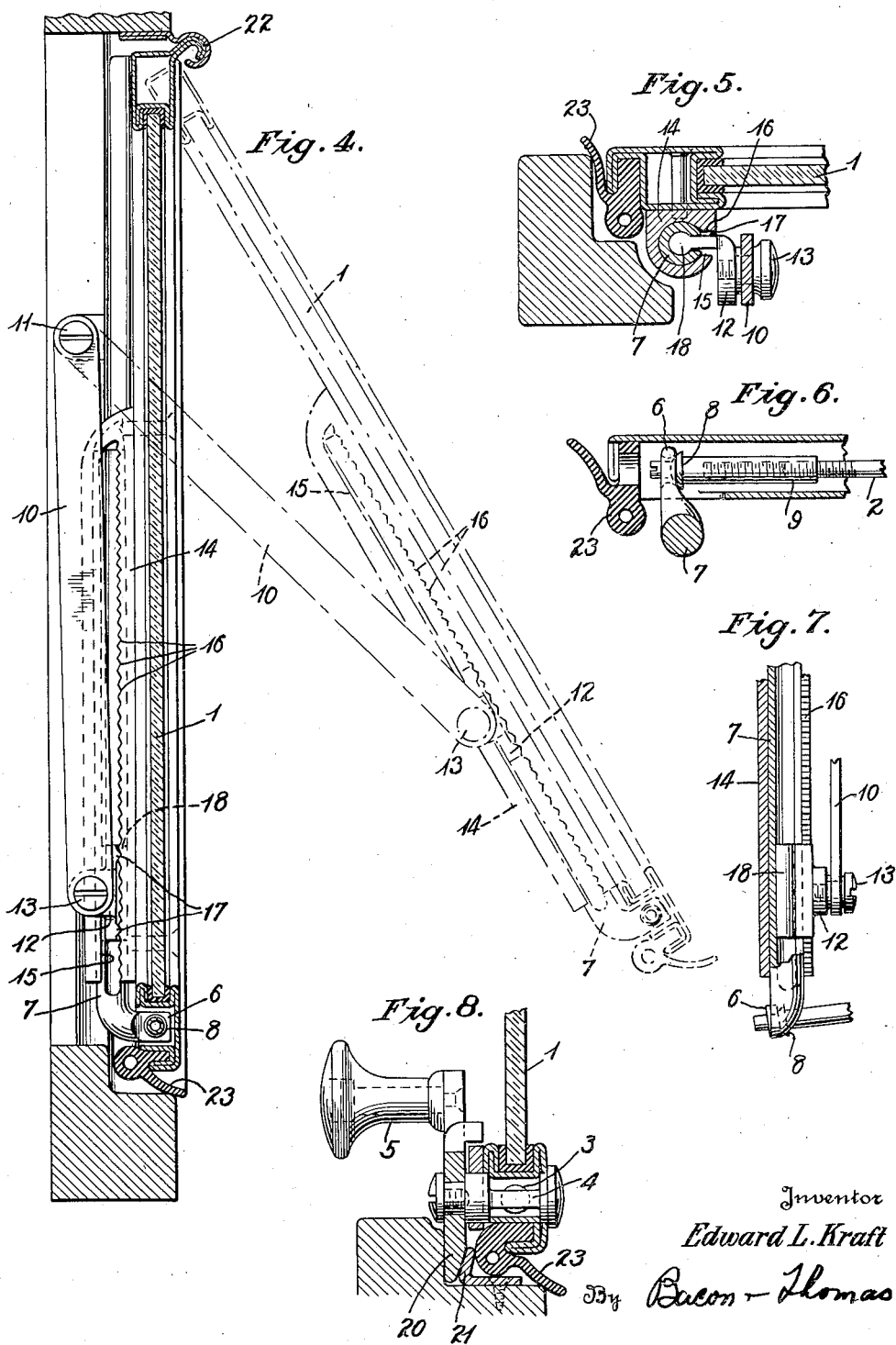

Patented Dec. 24, 1935

2,025,597

UNITED STATES PATENT OFFICE 2,025,597

WINDSHIELD FOR AUTOMOBILES

Edward L. Kraft, York, Pa., assignor to Martin-Parry Corporation, York, Pa., a corporation of Delaware Application August 25, 1931, Serial No. 559,297

5 Claims. (Cl. 296—84)

This invention relates to mechanism for adjusting windshields of automobiles. It is, in a measure, an improvement upon the Beitman application Serial No. 386,780, filed August 19, 1929.

An object of the present invention is to provide separate control mechanisms for duplex shields of the type wherein one shield may be adjusted independently of the other shield, as desired.

Another object of the invention is to provide a monocontrol for windshields with all of the locking mechanism concealed from view and wherein a single operating handle may be used to release locking mechanism and to simultaneously adjust the shield to its desired position and thence turned to lock it thereat.

Other objects of the invention will be apparent to those skilled in the art from a reading of the following specification in conjunction with the drawings attached hereto and forming a part hereof in which Fig. 1 represents a front elevation showing my duplex shield arrangement with independent handles for adjusting and locking each of the shield sections independently of the other;

Fig. 2 is a detail view showing how the shield is clamped to the windshield frame when in closed position;

Fig. 3 is a view showing the concealed longitudinally disposed locking rods and the manner in which they are actuated;

Fig. 4 is a side elevation taken on line 4—4 of Fig. 1;

Fig. 5 is a detail view taken on line 5—5 of Fig. 1;

Fig. 6 is a detail view taken on line 6—6 of Fig. 1;

Fig. 7 is a detail view showing my improved locking device; and

Fig. 8 is a view taken on line 8—8 of Fig. 1.

Referring now particularly to the drawings, I represents shields of identical construction, each of which is independently movable with respect to the other and which are commonly known as "duplex" shields. It is necessary to describe in detail only one of these shield sections and the locking mechanism therefor inasmuch as they are of identical construction, and consequently similar reference numerals are applied to both.

Within the sash of the windshield I there is provided a longitudinally movable locking bar 2 having an adjustable bearing 3 which is engaged by the cam 4 upon the rotation of the handle 5. The outer extremity of this locking bar is secured to the bell crank extension 6 of the locking tube 7, as shown at 8. Adjustability is also provided at this point as shown at 9.

The windshield is provided with a bracing arm 10 pivoted to the stationary windshield frame as at 11 and slidably connected with the windshield at the lower end thereof in a manner hereinafter described. The lower end of the bracing arm 10 is pivoted to a lever arm 12 by a suitable screw connection 13 and is rotatable thereon in order that the lever arm may turn relative to the bracing arm during the different positions of adjustment and consequently follows the slot in the tube which is now to be described.

Along the vertical sash of the windshield, I provide a stationary channel bracket 14 having a vertical, laterally disposed slot 15 with teeth 16 thereon. The lever arm 12 is provided with cooperating teeth 17 for engagement with the teeth 16 provided by the channel shaped bracket. This lever arm is further provided with a cylindrical portion 18 which snugly fits within the rotatable locking tube 7 with the shank of the lever arm extending through the slot provided by the locking tube and the slot provided by the channel shaped bracket respectively.

In operation, the driver of the automobile may, with one hand, while keeping his car under control with the other, grasp the handle 5 and rotate it which causes a rotational movement of the bell crank 6 and a corresponding movement of the rotatable tube 7 in order to align the slot of the tube with the slot provided by the channel shaped bracket to permit the shield and the lever arm to freely slide in the various positions of the shield. During this sliding action the lever arm may pivot relative to the bracing arm 10, as above described. When the desired position of adjustment has been reached, the handle is actuated in a manner to force the locking bar 2 outwardly and rotate the bell crank 6 and the locking tube 7 to cause the lever arm 12 to bind within the slot provided by the stationary channel shaped bracket 14. This movement of the locking tube causes the teeth provided by the lever arm and the side wall of the slot 15 respectively to contact with each other and interfit whereby a positive locking action is obtained which precludes the shield from moving from this position of adjustment.

When the shield is closed, as shown in Fig. 4, the projection 20, see Fig. 2, fits behind a stationary cam 21 provided by the windshield frame whereby the windshield is securely maintained in position.

Due to the arrangement of the lever arm and the lateral disposition of the slots located within the locking tube and the stationary channel bracket respectively, a very sightly, and yet satisfactory, looking arrangement is provided and, as will be noted, all parts are concealed from view and are easily controllable by the operator. The shield may be pivoted to the frame as at 22 by the conventional piano hinge, and suitable weather stripping 23 may be employed as desired.

Having thus described my invention, what I claim is:

1. In combination, a windshield frame, a windshield pivotally mounted therein, a brace arm for supporting the shield, said brace arm being pivoted at its upper end to the windshield frame and being slidably associated with the windshield at its lower end, means for preventing a sliding action between the brace arm and the shield when the desired position of adjustment has been reached, said means comprising a channel shaped bracket, a rotatable tube mounted therein, slots in the tube and bracket respectively, a lever arm pivotally attached to the lower portion of the brace arm and extending within said slots and retained within said rotatable tube, interlocking connections provided by the lever arm and the channel shaped bracket respectively, and means for rotating said tube to bring said interlocking connections into position, whereby to positively restrain movement of said shield relative to said brace arm.

2. In combination, a windshield frame of an automobile, a windshield pivotally mounted therein, a brace arm for supporting said shield, said brace arm being pivoted at one end to the windshield frame and being slidably associated at its other end to the windshield during the different positions of adjustment of the shield, a lever arm of bell crank formation attached to the lower end of the brace arm and pivotally movable with respect thereto, a locking tube for slidably receiving the adjacent end of the bell crank arm, and means for rotating said locking tube whereby to clamp said bell crank lever to the windshield for preventing relative sliding action between the shield and the brace arm.

3. In combination, a windshield frame, a windshield swingingly mounted therein, a brace arm for supporting the shield in its desired position of adjustment, said brace arm being pivoted at one end to the windshield frame and being slidably associated at its other end to the movable windshield, means for permitting or restraining sliding action between the shield and the brace arm, said means comprising a bracket attached to the shield and having a laterally disposed longitudinally extending slot therein, a locking tube disposed within said bracket and having a corresponding laterally disposed and longitudinally extending slot, a lever arm attached to the lower end of the brace arm and extending through said slots and slidably secured within said rotatable tube, teeth provided by said lever arm and by the bracket respectively, means for rotating said tube to bring said teeth into engagement whereby to restrain longitudinal movement between the lever arm and the bracket respectively for maintaining the shield in its selected position of adjustment.

4. A duplex windshield for automobiles having two independently adjustable windshield sections both of which are hinged at their upper ends and adapted for outward swinging movement, each of which is provided with means for locking said shields in their desired positions of adjustment, said means comprising a brace arm pivoted at one end to the windshield frame and slidably disposed at its other end to the windshield, means for preventing the sliding action between the brace arm and the shield when the shield has been adjusted to its desired position, said means comprising two telescopically associated members having registering slots, one of said members being fixed and the other being rotatable with respect to the windshield, a lever arm connected to the brace arm and having a portion passing through said slots, cooperating locking elements formed on the lever arm and the said member which is fixed with respect to the windshield, and means carried by the windshield for actuating the rotatable member for placing said cooperating locking elements into and out of locking relation.

5. A duplex windshield of the character described comprising two independently supported and outwardly movable shield sections, each of which is provided with control mechanism for adjusting and clamping the same in its various open positions, said control mechanism comprising a brace secured to the frame and to the shield respectively and slidably associated with the shield, means for locking the brace relative to the shield in its selected open position, said last named means including two telescopically associated members having registering slots, one of said members being fixed and the other being rotatable with respect to the windshield, a lever arm connected to the brace arm and having a portion passing through said slots, cooperating locking elements formed on the lever arm and the said member which is fixed with respect to the windshield, and means carried by the windshield for actuating the rotatable member for placing said cooperating locking elements into and out of locking relation.

EDWARD L. KRAFT.